(12) United States Patent
Terada et al.

(10) Patent No.: US 6,276,845 B1
(45) Date of Patent: Aug. 21, 2001

(54) POWER TRANSMISSION MECHANISM

(75) Inventors: Hiroshi Terada, Mitaka; Yukihiko Sugita, Kokubunji, both of (JP)

(73) Assignee: Olympus Optical Co., Ltd., Tokyo (JP)

( * ) Notice: Subject to any disclaimer, the term of this patent is extended or adjusted under 35 U.S.C. 154(b) by 0 days.

(21) Appl. No.: 09/425,980

(22) Filed: Oct. 25, 1999

(30) Foreign Application Priority Data

Oct. 29, 1998 (JP) .................................................. 10-308598
Oct. 29, 1998 (JP) .................................................. 10-308599

(51) Int. Cl.$^7$ ...................................................... G03B 1/00
(52) U.S. Cl. ............................. 396/413; 396/418; 192/44
(58) Field of Search .................................. 192/44, 45, 31, 192/38; 396/413, 418, 411; 242/356.6, 257, 394, 545

(56) References Cited

U.S. PATENT DOCUMENTS 3,476,226 * 11/1969 Massey .................................. 192/44

FOREIGN PATENT DOCUMENTS 3-200128   9/1991   (JP) .

* cited by examiner

Primary Examiner—W. B. Perkey
(74) Attorney, Agent, or Firm—Frishauf, Holtz, Goodman, Langer & Chick, P.C.

(57) ABSTRACT

The present invention provides a power transmission mechanism characterized in that two-directional rotations of a driving shaft can be transmitted to a driven-side shaft, it shows a high degree of freedom in arrangement even when it is applied to a driving force transmission system, the driving force of a driving-side input shaft can be transmitted to a driven-side ring via a roller in each of opposite directions, and when the rotational speed of the driven-side ring is higher than that of the driving-side input shaft, no driving force is transmitted from the driving-side input shaft to the driven-side ring in either of the opposite directions.

13 Claims, 6 Drawing Sheets

POWER TRANSMISSION MECHANISM

BACKGROUND OF THE INVENTION

This invention relates to a power transmission mechanism such as a clutch device for power transmission.

A one-way clutch device, for example, is used as a clutch device for performing power transmission switching.

The one-way clutch device is characterized in that a rotational force is transmitted only in one direction, i.e. only from a driving-shaft side to a driven-shaft side, but not from the driven-shaft side to the driving-shaft side.

The one-way clutch device is applied to, for example, a film feeder mechanism for use in a camera as disclosed in Japanese Patent Application KOKAI Publication No. 3-200128.

FIG. 12 shows a driving force transmission system incorporated in the film feeder mechanism.

In the film feeder mechanism, the driving force of a driving motor 103 as a driving source is transmitted to a sun gear 106, incorporated in a planetary gear mechanism, via a pinion 104 and a gear train 105. A planetary gear 107 incorporated in the planetary gear mechanism is selectively engaged with a driven gear 108 or a driven gear 109. The driven gear 108 is coupled to a gear 102a attached to a spool shaft 102 via a spool-side gear train 111, and also to an input-side gear 110a incorporated in a one-way clutch 110.

On the other hand, the driven gear 109 is engaged with an output-side gear 110b incorporated in the one-way clutch 110. The output-side gear 110b is coupled to a cartridge driving gear 113 via a cartridge-side gear 112.

The cartridge driving gear 113 has a fork section 113a engaged with a cartridge shaft 114. Concerning the one-way clutch 110, a direction indicated by arrow D13 is supposed to be the forward direction of rotation.

When forwarding a film 120b y the film feeder mechanism, the driven gear 108 is rotated via the planetary gear mechanism in a direction indicated by arrow D11. The cartridge driving gear 113 rotates via the one-way clutch 110 and the gear train 112 to forward the film 120. At the same time, the spool shaft 102 is also driven via the spool shaft gear train 111. When winding the forwarded film 120 on the spool shaft 102, the spool-shaft side forwarding speed is set higher than the cartridge-side speed.

Accordingly, an over-running state occurs in which the cartridge driving shaft 113 rotates at a high speed, and the output-side gear 110b is driven in the direction D13 at a relatively higher speed than the input-side gear 110a. The winding operation when photographing is the same as the above driving operation.

When rewinding the film, the motor 103 is rotated in an opposite direction to the above to engage the planetary gear 107 with the driven gear 109, whereby the driven gear 109 is rotated via the planetary gear mechanism in a direction indicated by arrow D12. Then, the output gear 110b of the one-way clutch 110 is directly rotated in a direction opposite to the direction D13, thereby rewinding the film 120 on the cartridge shaft. At this time, the spool shaft 102 is rotated in a direction opposite to the direction indicated by the arrow, in accordance with the movement of the film 120.

FIG. 13A illustrates an example of a structure of the one-way clutch.

In FIG. 13A, a driven-side ring 201 is constructed such that it covers a driving-side input shaft 202 with a predetermined space interposed therebetween. In this example, two rollers 200a and 200b are movably provided in the spaces defined between the driven-side ring 201 and the input shaft 202. When the driving-side input shaft 202 rotates in a direction indicated by arrow A, the rollers 200a and 200b each contact both an inner surface 201a of the driven-side ring 201 and a flat surface 202a of a cam section 202b of the driving-side input shaft 202. As a result, the driving force of the driving-side input shaft 202 is transmitted to the driven-side ring 201 via the rollers 200a and 200b, which means that both the input shaft 202 and the driven ring 201 rotate in the direction A. After the driving-side input shaft 201 starts to rotate at a higher speed than the ring 202, the rollers 200a and 200b are pushed by the inner surfaces 201a of the driven-side ring 201 in the direction of the rotation of the ring 201, thereby releasing the rollers held between the inner surfaces 201a and the flat surfaces 202a, and hence stopping the transmission of the driving force from the driving-side input shaft 202 to the driven-side ring 201.

When the rotational speed of the driving-side input shaft 202 has again become relatively higher than the driven-side ring 201, the two rollers 200a and 200b are held between the input shaft 202 and the ring 201 to thereby restart the transmission of the driving force from the input shaft 202 to the ring 201. On the other hand, when the driving-side input shaft 202 rotates in a direction indicated by arrow B, the rollers 200a and 200b are urged by the flat surfaces 202c of the input shaft 202, which does not cause the rollers 200a and 200b to be held between the input shaft 202 and the ring 201. As a result, no driving force is transmitted to the driven-side ring 201.

FIG. 13B is a sectional view of the one-way clutch.

As is shown in FIG. 13B, the driven-side ring 201 and the driving-side input shaft 202 are held between two bottom boards 203 and 204 such that the rollers 200a and 200b can move between the ring 201 and the input shaft 202.

As described above, the film feeder mechanism disclosed in Japanese Patent Application KOKAI Publication No. 3-200128 employs the one-way clutch 110 for linking the spool shaft with the cartridge side. However, the one-way clutch 110 cannot cause two-way transmission of a force supplied from the input driving side, and hence it is necessary to directly drive the output-side gear 110b when rewinding the film 120a s shown in FIG. 12.

To directly drive the output-side gear 110b, it is necessary to use another driving system for directly driving the gear 110b. Further, since the one-way clutch 110 has to be located between the cartridge driving system and the spool driving system, much space is required in the camera, and the structure of the camera is inevitably complicated.

BRIEF SUMMARY OF THE INVENTION

The present invention has been developed in light of the above-described circumstances, and aims at providing a power transmission mechanism which can perform transmission of two opposite directional rotations of a driving shaft to a driven-shaft side, and has a high degree of freedom in arrangement when it is applied to a driving power transmission system.

According to a first aspect of the invention, there is provided a power transmission mechanism comprising: a driving member rotatable both forward and backward; a driven member coaxial with the driving member; a first power transmission member for transmitting a forward driving force of the driving member to the driven member; and a second power transmission member for transmitting a backward driving force of the driving member to the driven member.

According to a second aspect of the invention, there is provided a power transmission mechanism comprising: a driving member rotatable both forward and backward; a driven member coaxial with the driving member; a first power transmission member movable in a first recess defined between the driving member and the driven member, the first power transmission member transmitting a forward driving force of the driving member to the driven member; and a second power transmission member movable in a second recess defined between the driving member and the driven member, the second power transmission member transmitting a backward driving force of the driving member to the driven member.

According to a third aspect of the invention, there is provide a camera comprising a power transmission mechanism that includes a driving member rotatable forward and backward, a driven member arranged coaxial with the driving member and engaged with an axis-of-rotation of the camera, a first power transmission member for transmitting a forward driving force of the driving member to the driven member, and a second power transmission member for transmitting a backward driving force of the driving member to the driven member.

According to a fourth aspect of the invention, there is provided a camera using a film cartridge that has a feeder port through which a film is forwarded and rewound, comprising a power transmission mechanism that includes a driving member rotatable forward and backward, a driven member arranged coaxial with the driving member and engaged with an axis-of-rotation of the film cartridge, a first power transmission member for transmitting a forward driving force of the driving member to the driven member, and a second power transmission member for transmitting a backward driving force of the driving member to the driven member.

According to a fifth aspect of the invention, there is provided a camera using a film cartridge that has a feeder port through which a film is forwarded and rewound, comprising a power transmission mechanism that includes a driving member rotatable forward and backward, a driven member arranged coaxial with the driving member and engaged with a spool shaft incorporated in the film cartridge, a first power transmission member movable in a first recess defined by the driving member and the driven member, the first power transmission member transmitting a forward driving force of the driving member to the driven member, and a second power transmission member movable in a second recess defined by the driving member and the driven member, the second power transmission member transmitting a backward driving force of the driving member to the driven member.

According to a sixth aspect of the invention, there is provided a power transmission mechanism comprising: a first power transmission member; a second power transmission member; a ring member provided on a driven side; and a cam member provided on a driving side; the cam member being constructed such that: when a rotational speed of the cam member is higher than a rotational speed of the ring member, the cam member prevents, while rotating in one direction, the first transmission member from contacting an inner surface of the ring member, and causes the second transmission member to be held between the cam member and the ring member, whereby the cam member and the ring member rotate together, and the cam member prevents, while rotating in another direction, the second transmission member from contacting an inner surface of the ring member, and causes the first transmission member to be held between the cam member and the ring member, whereby the cam member and the ring member rotate together.

According to a seventh aspect of the invention, there is provided a power transmission mechanism comprising: a driving member rotatable both forward and backward; a driven member coaxial with the driving member; and first and second power transmission members movable between the driving member and the driven member in a plane perpendicular to an axis of rotation of the driving member, wherein when the driving member rotates forward, the first power transmission member transmits power to the driven member, whereas when the driving member rotates backward, the second power transmission member transmits power to the driven member.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments given below, serve to explain the principles of the invention.

DETAILED DESCRIPTION OF THE INVENTION

The embodiments of the invention will be described with reference to the accompanying drawings.

First, a roller clutch device employed in the invention will be described.

Figure 1A:
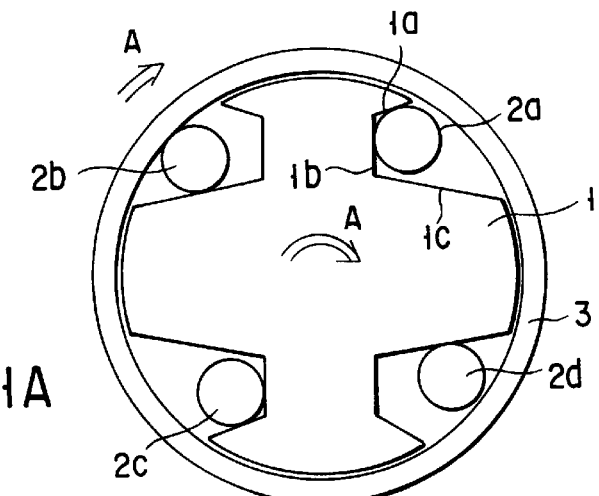
FIG. 1A is a top view illustrating a roller clutch device as a power transmission mechanism according to a first embodiment of the invention.
Figure 1B:
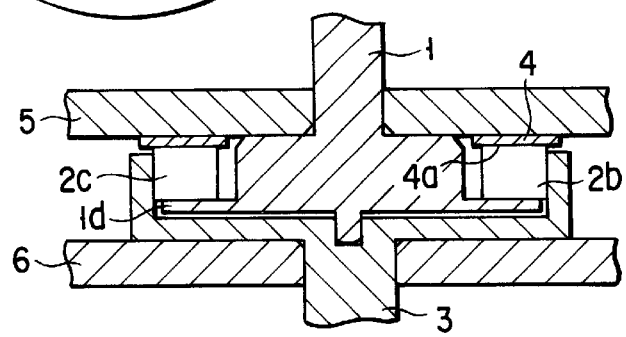
FIG. 1B is a sectional side view illustrating the roller clutch device of FIG. 1A.

FIGS. 1A and 1B are views showing the roller clutch device. FIG. 1A is a top view, while FIG. 1B is a sectional side view.

As is shown in FIG. 1A, a driven-side ring 3 is constructed such that it covers a driving-side input shaft 1 with a predetermined space therebetween. In this case, four rollers 2a–2d are movably provided in spaces (recesses) defined between the driven-side ring 3 and the driving-side input shaft 1. The driving-side input shaft 1 has holding surfaces 1a and 1b for holding the rollers 2a –2d, and locking surfaces 1c for locking them. In accordance with the direction of rotation, the driving-side input shaft 1 holds or locks the rollers 2a –2d, using the holding surfaces 1a and 1b or the locking surfaces 1c.

As is shown in FIG. 1B, the driven-side ring 3 and the driving-side input shaft 1 are held between bottom boards 5 and 6. The driving-side input shaft 1 has roller support sections ld for supporting the rollers 2a –2d, and a friction sheet 4 is provided between the bottom board 5 and each of the rollers 2a –2d. The friction sheet 4 is provided to impart only a small amount of friction to each of the rollers 2a –2d, and is formed of a thin sheet having a smooth surface and elasticity in its thickness direction.

Referring then to FIGS. 2A–2D, the operation of the roller clutch device constructed as above will be described. In the case shown in FIG. 2A–2D, the driving-side input shaft 1 is supposed to rotate in a direction indicated by arrow B.

Figure 2A:
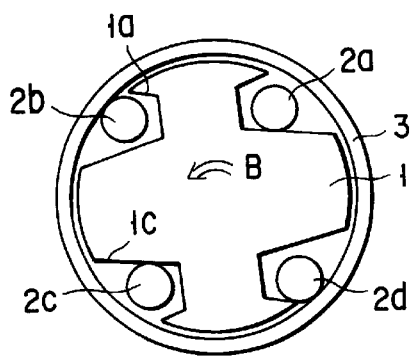
FIG. 2A is a view useful in explaining a state in which a driving-side input shaft 1 incorporated in the roller clutch device as the power transmission mechanism of the first embodiment starts to rotate.
Figure 2B:
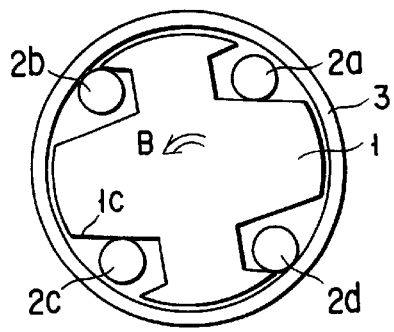
FIG. 2B is a view useful in explaining a state in which rollers 2a and 2c incorporated in the roller clutch device as the power transmission mechanism of the first embodiment are in contact with locking surfaces 1c of the driving-side input shaft 1, while rollers 2b and 2d are in contact with holding surfaces 1a of the driving-side input shaft 1.
Figure 2C:
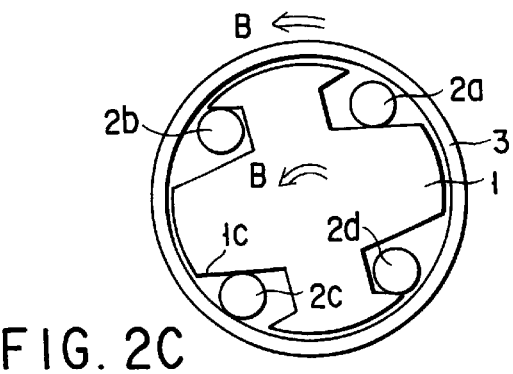
FIG. 2C is a view useful in explaining a state in which the rollers 2b and 2d incorporated in the roller clutch device as the power transmission mechanism of the first embodiment rotate in accordance with the rotation of the driving-side input shaft 1.
Figure 2D:
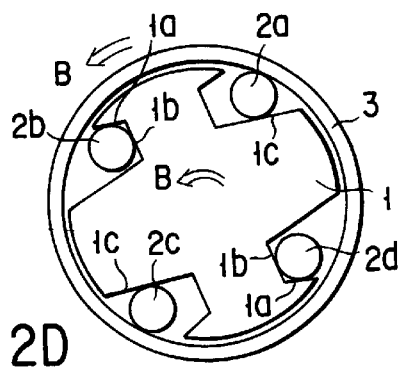
FIG. 2D is a view useful in explaining a state in which a driven-side ring 3 incorporated in the roller clutch device as the power transmission mechanism of the first embodiment starts to rotate.

First, when the driving-side input shaft 1 has started to rotate as shown in FIG. 2A, the rollers 2a and 2c are brought into contact with the locking surfaces 1c of the shaft 1, while the rollers 2b and 2d are brought into contact with the holding surfaces 1a of the shaft 1, as is shown in FIG. 2B.

After the driving-side input shaft 1 further rotates, the rollers 2a and 2c are held by the two holding surfaces 1a and 1b without contacting the driven-side ring 3, and rotate in accordance with the rotation of the driving-side input shaft 1. On the other hand, the rollers 2a and 2c are locked between the locking surfaces 1c of the driving-side input shaft 1 and inner peripheral surfaces of the driven-side ring 3, thereby transmitting the driving force of the driving-side input shaft 1 to the driven-side ring 3. As a result, the driven-side ring 3 starts to rotate in the direction B (see FIGS. 2C and 2D).

When the driven-side ring 3 has started to rotate at a higher speed than the driving-side input shaft 1, the rollers 2a and 2c are pushed by the inner surfaces of the ring 3 in the direction of rotation of the ring 3, thereby releasing their fixed state and hence stopping the transmission of the driving force. When the rotational speed of the driven-side ring 3 has come to be lower than that of the driving-side input shaft 1, the rollers 2a and 2c are locked, as aforementioned, by the locking surfaces 1c of the driving-side input shaft 1 and the inner surfaces of the driven-side ring 3, thereby transmitting the driving force.

Since the a small amount of friction is imparted from the friction sheet 4 to the rollers 2a –2d, both the holding state and the locking state are kept stable.

In the above description made referring to FIGS. 2A–2D, the driving-side input shaft 1 rotates in the direction B. On the other hand, in the case where the shaft 1 rotates in the opposite direction A, the rollers 2b and 2d are arranged to be locked to transmit the driving force of the input shaft 1, while the rollers 2a and 2c are held by the holding surfaces la and 1b (see FIG. 3A).

Figure 3A:
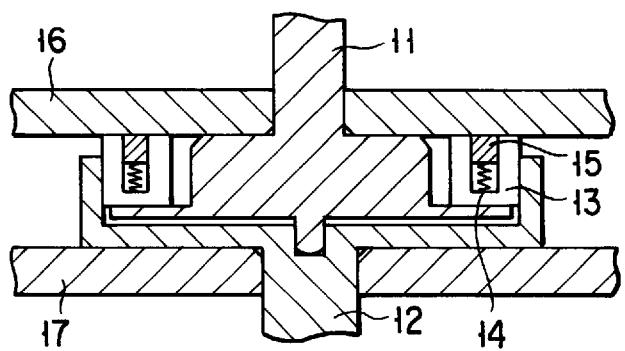
FIG. 3A is a sectional view illustrating a roller clutch device according to a second embodiment.
Figure 3B:
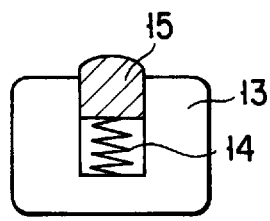
FIG. 3B is a sectional view illustrating, in detail, a roller 13 incorporated in the roller clutch device of the second embodiment.

Referring then to FIGS. 3A and 3B, a roller clutch device according to a second embodiment will be described. FIG. 3A is a sectional side view showing a roller clutch device as a first improved example, while FIG. 3B is a view showing in detail one of rollers 13 employed in the device of FIG. 3A.

As is shown in FIGS. 3A and 3B, this embodiment is similar to the first embodiment in that a driving-side input shaft 11 and a driven-side ring 12 are held between bottom boards 16 and 17, but differs in that each roller 13 has a structure different from the rollers employed in the first embodiment. In other words, in this embodiment, a hole with a bottom is provided at a central portion of each roller 13, in which a friction spring 14 and a friction pin 15 are provided to impart the same function as the friction sheet 4. When the friction pin 15 is urged by the friction spring 14 against the bottom board 16, the holding or locking state of each roller 13 is stabilized. The friction pin 15 is inserted in the hole such that it can axially slide therein.

Figure 4A:
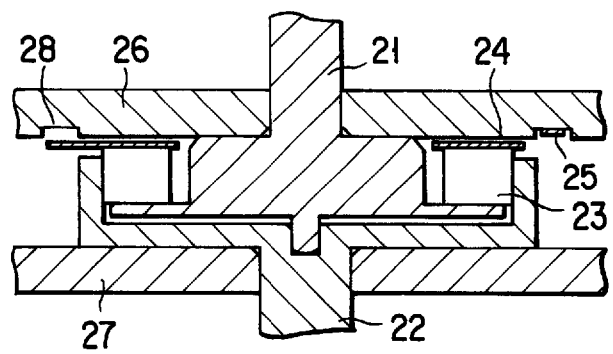
FIG. 4A is a view illustrating a roller clutch device according to a third embodiment of the invention.
Figure 4B:
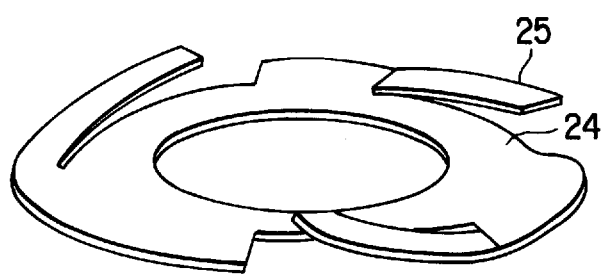
FIG. 4B is a view showing a spring section 25 incorporated in a friction spring used in the embodiment of FIG. 4A.

FIGS. 4A and 4B illustrate a roller clutch device according to a third embodiment.

FIG. 4A is a sectional side view of the roller clutch device.

As shown in FIG. 4A, the third embodiment is similar to the above-described embodiments in that a driving-side input shaft 21 and a driven-side ring 22 are held between bottom boards 26 and 27, but differs in that a friction spring is provided on the upper end of each roller 23 to impart friction using the elastic force of the plate spring. In the figure, a recess 28 is used to hold a spring portion 25 of the friction spring, and formed concentric with the axis of the clutch device.

FIG. 4B shows the structure of the friction spring in detail.

As is shown in FIG. 4B, the friction spring has three spring portions 25 and a roller pressing portion 24. The rollers 23 are urged by the elastic force of the spring portions 25. It is a matter of course that the number of the spring portions 25 can be increased or decreased in accordance with the number of the rollers.

Figure 4C:
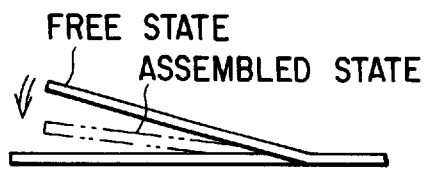
FIG. 4C is a view useful in explaining the operation state of the spring section 25.

FIG. 4C is a view useful in explaining the operation of the friction spring.

As is shown as "FREE STATE" in FIG. 4C, before the friction spring is attached to the clutch device, each spring portion 25 has a certain height with respect to the roller pressing portion 24. The aforementioned elastic force is created by changing the state of each spring portion 25 to"ASSEMBLED STATE" in FIG. 4C.

Figure 5A:
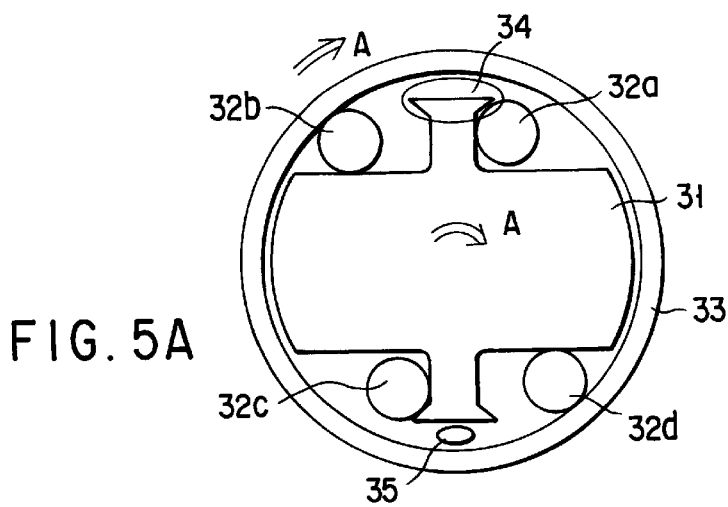
FIG. 5A is a view illustrating a roller clutch device according to a fourth embodiment of the invention.
Figure 5B:
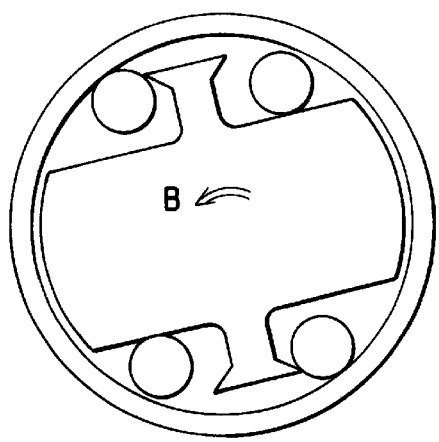
FIG. 5B is a view useful in explaining a state in which rollers start to be brought into contact with a driving-side input shaft and a driven-side ring.
Figure 5C:
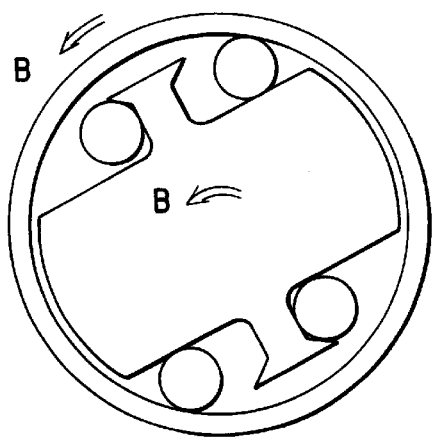
FIG. 5C is a view useful in explaining a state in which an output shaft incorporated in the roller clutch device of the fourth embodiment rotates.

Referring then to FIGS. 5A–5C, a roller clutch device according to a fourth embodiment will be described.

In this embodiment, a smaller holding section than in the above-described embodiments is formed in each of two spaces, instead of providing, as in the above-described embodiments, four spaces in which the rollers can move.

More specifically, as shown in FIG. 5A, a driven-side ring 33 covers a driving-side input shaft 31 with a predetermined space therebetween. The driving-side input shaft 31 has two holding portions 34. A predetermined clearance 35 is defined between each holding portion 34 and the driven-side ring 33. The rollers 32a–32d are slidably provided in the two spaces between the driving-side input shaft 31 and the driven-side ring 33.

Suppose that the driving-side input shaft 31 is driven in a direction indicated by arrow A in the roller clutch device constructed as above. At this time, the rollers 32b and 32d are locked between inner surfaces of the driven-side ring 33 and the locking surfaces of the driving-side input shaft 31, thereby transmitting the driving force of the input shaft 31 to the ring 33. On the other hand, the rollers 32a and 32c are held by the holding portions 34 and are out of contact with the driven-side ring 33.

Then, suppose that the driving-side input shaft 31 is driven in a direction indicated by arrow B and opposite to the direction A. At this time, the rollers 32b and 32d are brought into contact with the holding portions 34 of the driving-side input shaft 31 and inner surfaces of the driven-side ring 33. In the same manner as in the above-described embodiments, the rollers 32b and 32d are pulled toward the axis of the driving-side input shaft 31. Further, since the clearance 35 between each holding portion 34 and the driven-side ring 33 is smaller than the outer diameter of each roller, the rollers do not move over the holding portions 34 although each pair of adjacent spaces communicate with each other, with a corresponding holding portion interposed therebetween (see FIG. 5B). After the clutch device further rotates, power transmission starts, and the rollers 32b and 32d on the non-transmission side are completely pulled to the holding portions 34 (see FIG. 5C).

As described above, in the roller clutch device of the present invention, rollers are independently provided for locking the input and output shafts of the device when the clutch device rotates in one direction and in the opposite direction. Further, while in this clutch device, one pair of rollers are locked, the other pair of rollers are not locked. As a result, transmission of a driving force can be realized in opposite directions. Moreover, the two-way transmission of a driving force can be executed by a simple structure, and transmission inhibiting control can be easily performed by the simple structure when the rotational speed is higher at the output side than at the input side.

The role of the friction member will be described.

Where no friction member is used, the rollers that are in the non-locked state can move freely, and hence will move toward the locking surfaces, depending upon their attitudes or when a shock has been applied thereto. This problem can be overcome by the employment of the friction member. In light of this point, the aforementioned "a small amount of friction" indicates a friction that can prevent movement of each roller when a supposed shock has been applied thereto.

A camera that employs one of the roller clutch devices according to the invention will now be described in detail.

Figure 6A:
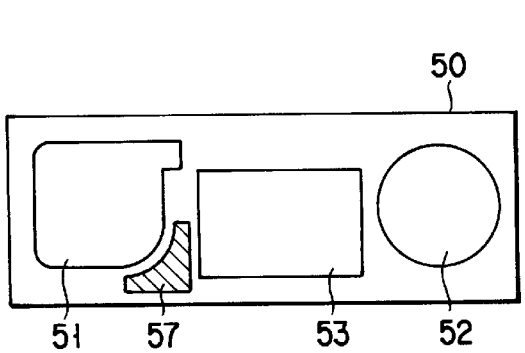
FIG. 6A is a top view of a camera according to a fifth embodiment.
Figure 6B:
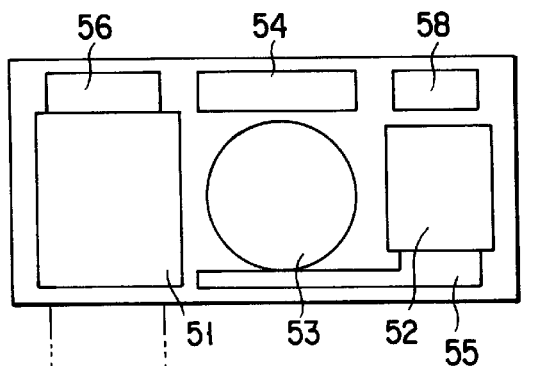
FIG. 6B is a front view of the camera of the fifth embodiment.

FIGS. 6A and 6B show a camera according to a fifth embodiment of the invention.

In this embodiment, one of the above-described roller clutch devices is applied to a camera using an IX240 film. FIG. 6A is a top view of the camera, while FIG. 6B is a front view of the camera.

As is shown in FIGS. 6A and 6B, a camera main body 50 comprises a cartridge chamber 51, a spool chamber 52, a lens unit 53, a finder unit 54, a film driving unit 55, a film driving section 56, and a strobe unit 58. In this case, an openable/closable cartridge lid is provided at a predetermined lower portion of the camera main body 50 so that a film cartridge can be mounted and dismounted from below through the lid. The spool chamber 52 contains a film driving motor (not shown). A C fork (not shown) is provided at an upper portion of the cartridge chamber 51 for forwarding and rewinding the film. The vertical power transmission from the film driving motor is generally executed in the vicinity of an area 57, using a shaft (not shown).

Since in the aforementioned conventional technique, a pair of a planetary gear and a one-way clutch are employed in the structure as above, the mechanism is inevitably complicated and large. On the other hand, in the camera of the invention, a roller clutch device that can execute two-way transmission of a driving force is applied to the film driving section 56, whereby it suffices if only an always rotating shaft is inserted in the area 57. This means that the entire mechanism can be made compact.

Figure 7:
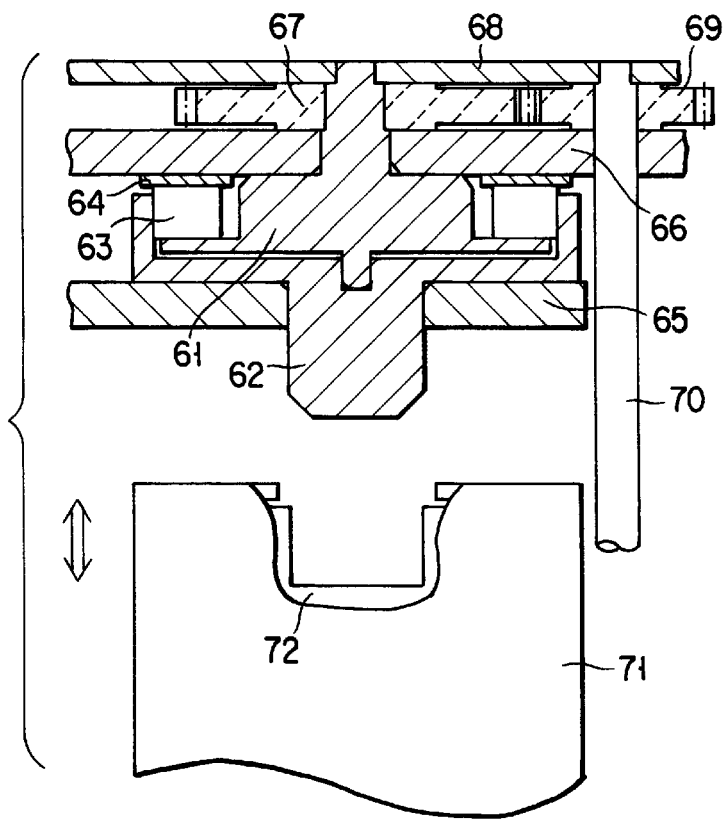
FIG. 7 is a view illustrating, in detail, a film driving section 56 and its peripheral elements, which are incorporated in a camera according to a fifth embodiment.

Referring to FIG. 7, the film driving section 56 and its peripheral structure will be described in detail. In FIG. 7, a clutch cam 61 coaxial with a C fork 62 is provided in the C fork 61 such that it can rotate about its axis, and rollers 63 are movably provided at predetermined locations of the clutch cam 61. Each roller 63 has its lower surface supported by the clutch cam 61, and its upper surface supported by a clutch bottom board 66 with a friction sheet 64 interposed therebetween.

The C fork 62 is supported by the upper surface of a cartridge chamber 65. A clutch gear 67 and an RW gear 69 are provided on the upper surface of the clutch bottom board 66, and a gear lid 68 is provided on the upper surfaces of the gears 67 and 69.

The C fork 62 has a key member (an engagement section to be engaged with a cartridge 71) not shown and urged by a spring. The C fork 62 is engaged, via the key member, with a spool shaft 72 incorporated in the cartridge 71. Although the clutch cam 61 and the clutch gear 67 are arranged to rotate in the same direction, by their D-shaped shaft and hole, it is a matter of course that they may be formed integral as one body or attached to each other, instead of using the D-shaped shaft and hole. The same can be said of the combination of the RW gear and an RW shaft 70.

Figure 8:
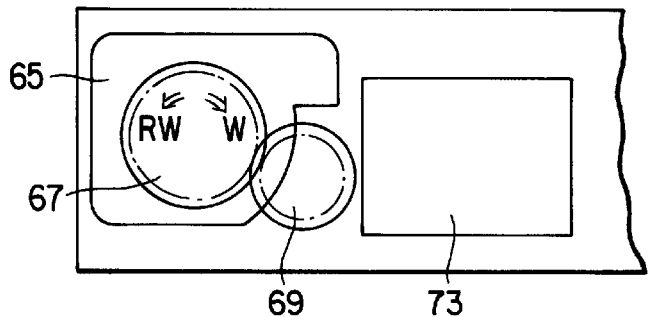
FIG. 8 is a schematic top view of the camera according to the fifth embodiment.

Referring then to FIG. 8 that is a schematic top view of the camera, the film feeding operation will be described.

When the IX240 film is forwarded, if the clutch gear 67 is rotated in a direction indicated by arrow W, the clutch section is locked, thereby rotating the C fork 62 in the same direction. As a result, the film is forwarded and guided to a spool. At this time, the spool rotates at a higher speed than the film, and hence the film is tightly wound on the spool. Since the rotational speed of the spool is higher than that of the C fork 62, the speed of the C fork 62 is accelerated by the film speed that is higher than the driving-side speed. This releases the locked state of the clutch cam 61 and the C fork 62. Then, they continue to rotate at different speeds. On the other hand, when the IX240 film is rewound, the clutch gear 67 rotates in a direction indicated by arrow RW, thereby locking the clutch section and causing the C fork 62 to start RW directional rotation. At the time of rewinding, the C fork 62 is not rotated by the film, and accordingly the clutch section is kept locked until the rewinding operation is finished.

Figure 9:
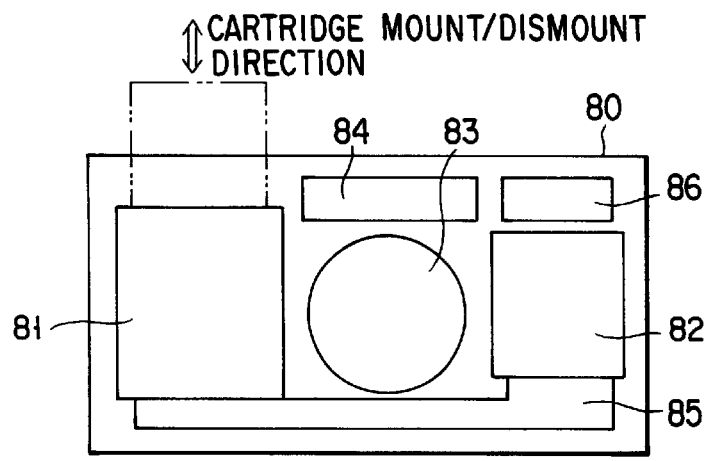
FIG. 9 is a view showing a camera according to a sixth embodiment.

Referring then to FIG. 9, a camera according to a sixth embodiment will be described.

The sixth embodiment differs from the fifth embodiment in that in the former, the IX240 film cartridge is inserted into the camera from above.

As is shown in FIG. 9, a camera main body 80 comprises a cartridge chamber 81, a spool chamber 82, a lens unit 83, a finder unit 84, a film driving unit 85 including a film driving section, and a strobe unit 86. In this case, an openable/closable cartridge lid is provided at a predetermined upper portion of the camera main body 80 so that a film cartridge can be mounted and dismounted from above through the lid. The spool chamber 82 contains a film driving motor (not shown). A C fork (not shown) is provided at an upper portion of the cartridge chamber 81 for forwarding and rewinding the film.

Since in the aforementioned conventional technique, a pair of a planetary gear and a one-way clutch are employed in the structure as above, the mechanism is inevitably complicated and large. On the other hand, in the camera of the invention, a roller clutch device that can execute two-way transmission of a driving force is applied to the film driving section included in the film driving unit 85. This means that the entire mechanism can be made compact.

Figure 10:
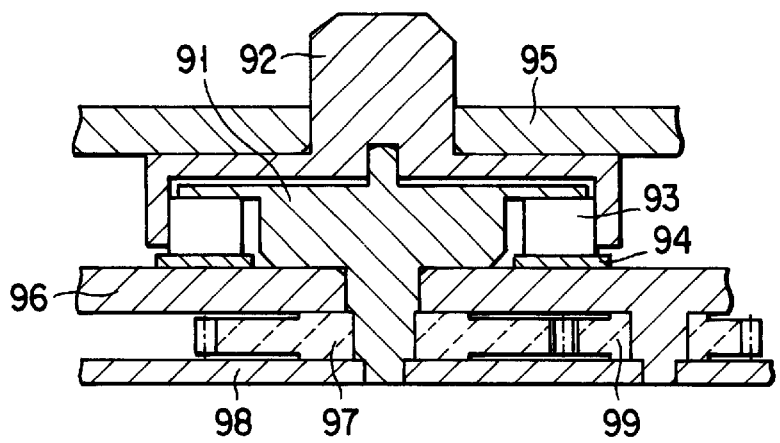
FIG. 10 is a sectional view of a film driving section incorporated in the camera according to the sixth embodiment.

Referring to FIG. 10, the film driving section and its peripheral structure will be described in detail.

The main structure and operation are substantially the same as those described with reference to FIG. 7. In this embodiment, however, the driving force of the film driving motor can be transmitted to the roller clutch device without the RW shaft. In FIG. 10, a C fork 92 has a key member not shown and urged by a spring. The C fork 92 is engaged, via the key member, with a spool shaft incorporated as a predetermined shaft in a cartridge (not shown). Although the clutch cam 91 and the clutch gear 97 are arranged to rotate in the same direction, by their D-shaped shaft and hole, it is a matter of course that they may be formed integral as one body or attached to each other, instead of using the D-shaped shaft and hole. The same can be said of the combination of an RW gear 99 and an RW shaft 96.

Figure 11A:
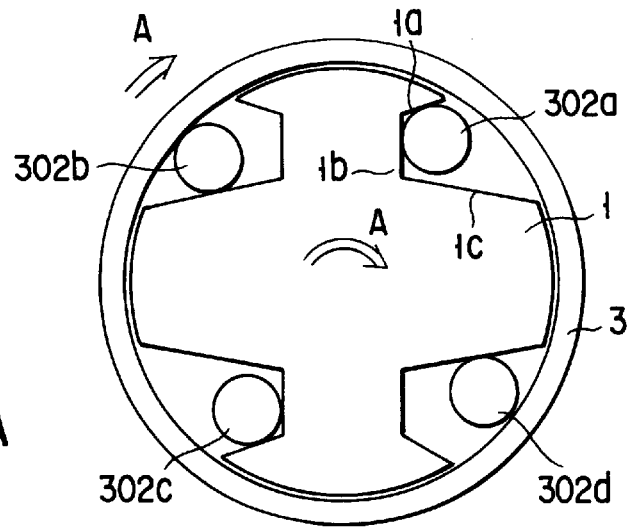
FIG. 11A is a top view illustrating a roller clutch device as a power transmission mechanism according to a seventh embodiment of the invention.
Figure 11B:
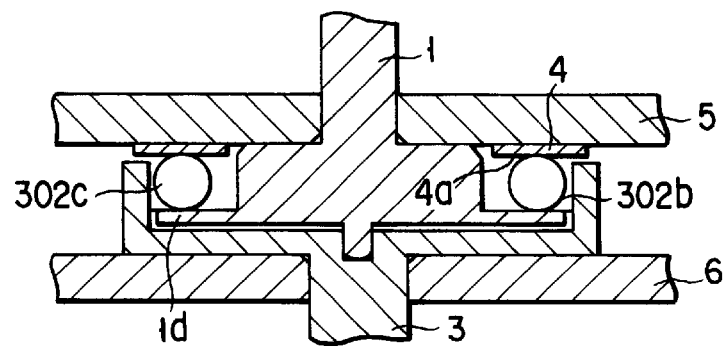
FIG. 11B is a sectional side view illustrating the roller clutch device of FIG. 11A.
Figure 12:
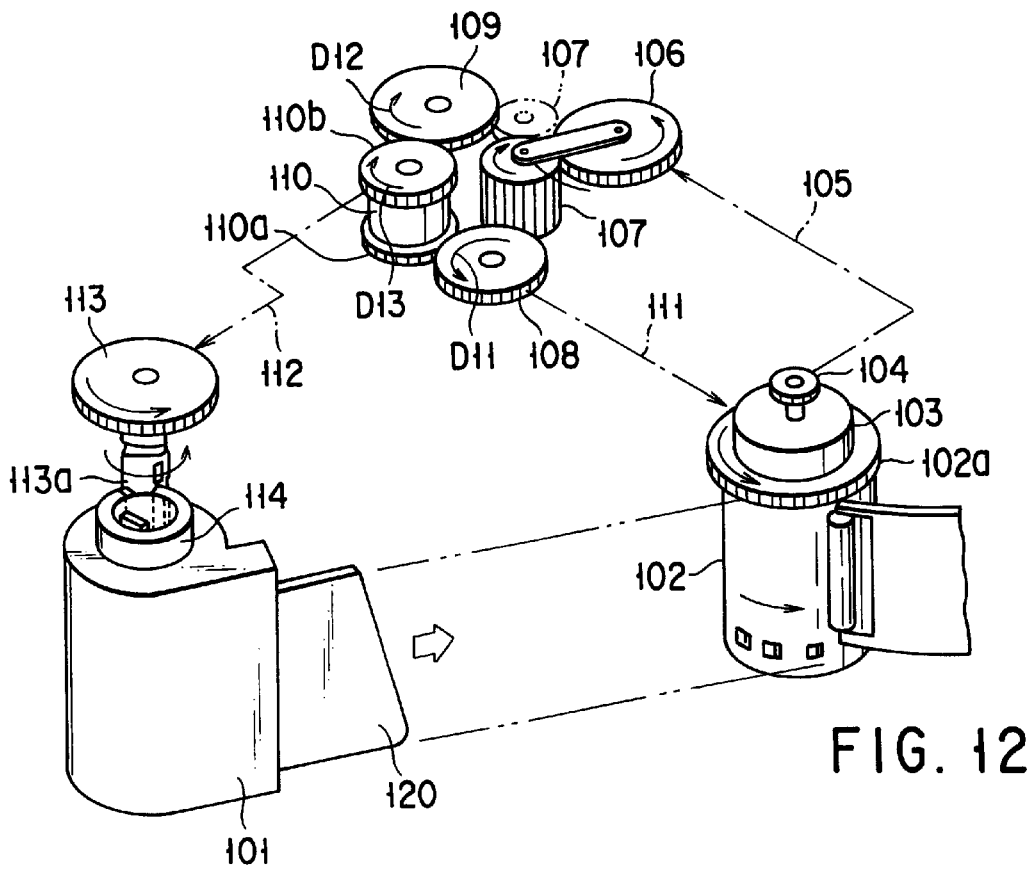
FIG. 12 is a view showing a driving transmission system incorporated in a conventional film feeder mechanism.
Figure 13A:
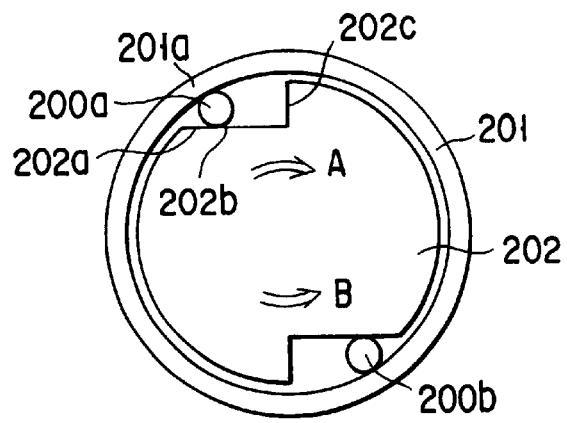
FIG. 13A is a plan view of a conventional one-way clutch.
Figure 13B:
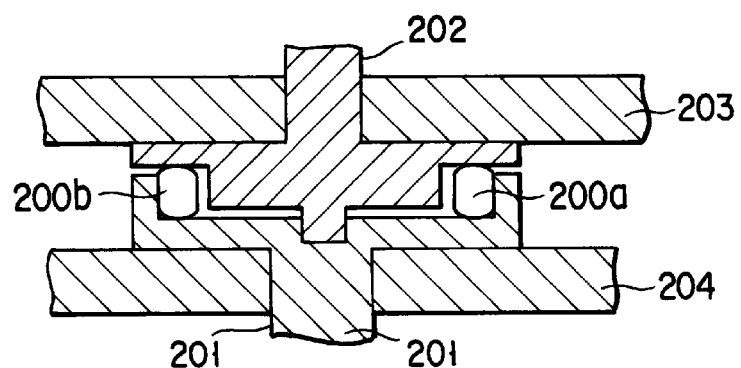
FIG. 13B is a sectional view showing the conventional one-way clutch of FIG. 13A.

FIGS. 11A and 11B illustrate a roller clutch device as a power transmission mechanism according to a seventh embodiment. FIG. 11A is a top plan view, and FIG. 11B is a sectional side view. It is a matter of course that the rollers include rollers 302a–302d as shown in these figures. Since the other structural elements are similar to those shown in FIG. 1, corresponding reference numerals are attached thereto, and no detailed description will be given thereof.

As described above, in the embodiments of the present invention, the roller clutch device is constructed such that rollers are independently provided for locking the input and output shafts of the clutch device when the device rotates in one direction and in the opposite direction, one pair of rollers being locked, and the other pair of rollers being unlocked, thereby realizing transmission of a driving force in opposite directions. By applying this roller clutch device to a camera, the camera can be made compact and simple in structure, and can perform high accurate driving control.

As described above in detail, the present invention can provide a camera using a power transmission mechanism, a clutch device, which can transmit the rotation of a driving shaft in each of opposite directions to a driven shaft, and which shows a high freedom in arrangement when applied to a driving force transmission system.

Additional advantages and modifications will readily occur to those skilled in the art. Therefore, the present invention in its broader aspects is not limited to the specific details, representative devices, and illustrated examples shown and described herein. Accordingly, various modifications may be made without departing from the spirit or scope of the general inventive concept at defined by the appended claims and their equivalents.

What is claimed is:

1. A camera comprising a power transmission mechanism that includes a driving member rotatable forward and backward, a driven member arranged coaxial with the driving member and engaged with an axis-of-rotation of the camera, a first power transmission member for transmitting a forward driving force of the driving member to the driven member, and a second power transmission member for transmitting a backward driving force of the driving member to the driven member.

2. A camera using a film cartridge that has a feeder port through which a film is forwarded and rewound, comprising a power transmission mechanism that includes a driving member rotatable forward and backward, a driven member arranged coaxial with the driving member and engaged with an axis-of-rotation of the film cartridge, a first power transmission member for transmitting a forward driving force of the driving member to the driven member, and a second power transmission member for transmitting a backward driving force of the driving member to the driven member.

3. A camera according to claim 2, wherein the power transmission mechanism is provided in a longitudinal direction of the film cartridge.

4. A camera according to claim 2, wherein the power transmission mechanism is provided in an upper portion or a lower portion of a container in which the film cartridge is located.

5. A camera according to claim 2, wherein
   the first power transmission member transmits the forward driving force of the driving member to the driven member when the first power transmission member contacts both a first predetermined surface of the driving member and the driven member; and
   the second power transmission member transmits the backward driving force of the driving member to the driven member when the second power transmission member contacts both a second predetermined surface of the driving member and the driven member.

6. A camera according to claim 2, wherein the first and second power transmission members interrupt transmission of the driving force to the driven member when a rotational speed of the driven member is higher than a rotational speed of the driving member.

7. A camera according to claim 2, wherein when a rotational speed of the driven member is higher than a rotational speed of the driving member, the first power transmission member becomes out of contact with at least one of a first predetermined surface of the driving member and the driven member, and the second power transmission member becomes out of contact with at least one of a second predetermined surface of the driving member and the driven member.

8. A camera using a film cartridge that has a feeder port through which a film is forwarded and rewound, comprising a power transmission mechanism that includes a driving member rotatable forward and backward, a driven member arranged coaxial with the driving member and engaged with a spool shaft incorporated in the film cartridge, a first power transmission member movable in a first recess defined by the driving member and the driven member, the first power transmission member transmitting a forward driving force of the driving member to the driven member, and a second power transmission member movable in a second recess defined by the driving member and the driven member, the second power transmission member transmitting a backward driving force of the driving member to the driven member.

9. A power transmission mechanism comprising:

a first power transmission member;

a second power transmission member;

a ring member provided on a driven side; and a cam member provided on a driving side;

the cam member being constructed such that:

when a rotational speed of the cam member is higher than a rotational speed of the ring member, the cam member prevents, while rotating in one direction, the first transmission member from contacting an inner surface of the ring member, and causes the second transmission member to be held between the cam member and the ring member, whereby the cam member and the ring member rotate together, and the cam member prevents, while rotating in another direction, the second transmission member from contacting an inner surface of the ring member, and causes the first transmission member to be held between the cam member and the ring member, whereby the cam member and the ring member rotate together.

10. A power transmission mechanism according to claim 9, wherein each of the first and second power transmission members is formed of a roller.

11. A power transmission mechanism according to claim 9, wherein each of the first and second power transmission members is formed of a ball.

12. A power transmission mechanism according to claim 9, wherein the ring member covers the cam member.

13. A power transmission mechanism according to claim 9, wherein when a rotational speed of the cam member is lower than a rotational speed of the ring member, the cam member and the ring member rotate relative to each other in each of said one direction and said another direction.

* * * * *